Figure 1:
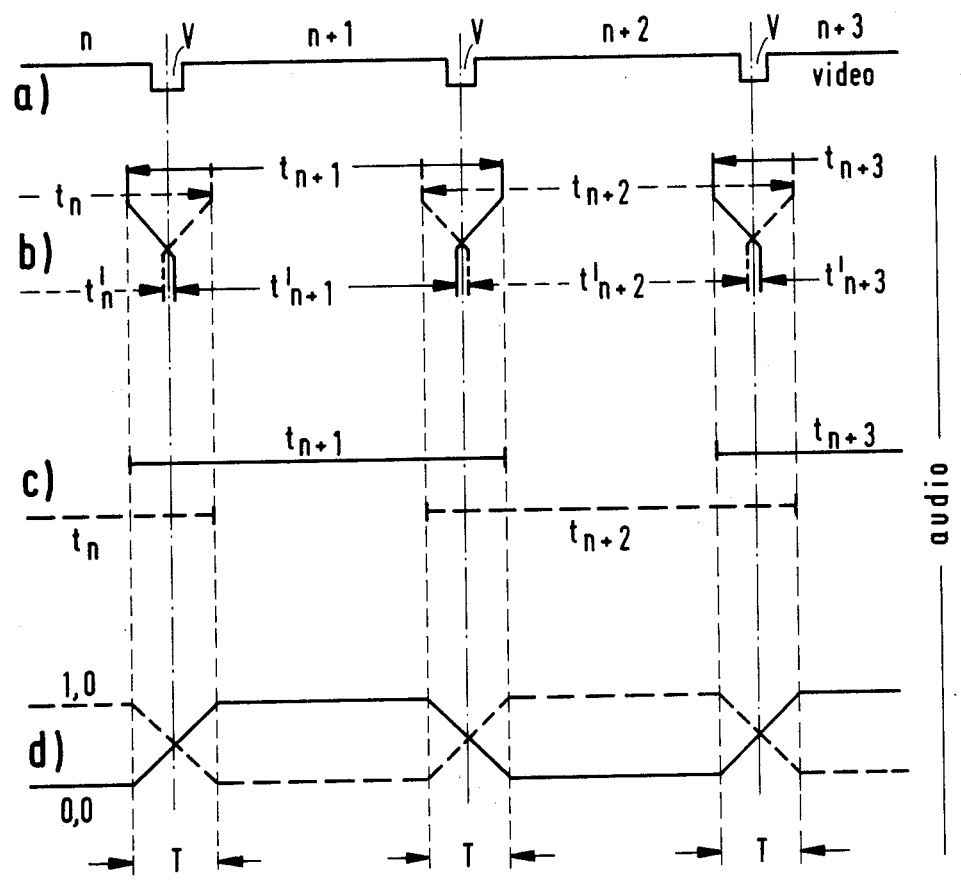

United States Patent [19]

Heitmann

[11] Patent Number: 4,717,972
[45] Date of Patent: Jan. 5, 1988

[54] PROCESS FOR STORING DIGITALLY CODED VIDEO SYNCHRONOUS SOUND SIGNALS THROUGH TIME COMPRESSION BY DUPLICATING SOUND DATA DURING RECORDATION

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 840,572

[22] PCT Filed: Jun. 25, 1985

[86] PCT No.: PCT/DE85/00212

§ 371 Date: Jan. 17, 1986

§ 102(e) Date: Jan. 17, 1986

[87] PCT Pub. No.: WO86/00772

PCT Pub. Date: Jan. 30, 1986

[30] Foreign Application Priority Data

Jul. 6, 1984 [DE] Fed. Rep. of Germany ....... 3424816

[51] Int. Cl.$^4$ .......................... G11B 27/02; H04N 5/78
[52] U.S. Cl. .......................................... 360/8; 360/13; 360/19.1
[58] Field of Search .................... 360/13, 32, 8, 19.1; 358/343, 342

[56] References Cited

U.S. PATENT DOCUMENTS

| | | | |
|---|---|---|---|
| 3,872,503 | 3/1975 | Shutterly | 360/8 |
| 4,224,642 | 9/1980 | Mawatari et al. | 360/32 |
| 4,353,090 | 10/1982 | Broadbent | 358/342 |
| 4,363,049 | 12/1982 | Ohtsuki et al. | 360/13 |
| 4,445,149 | 4/1984 | Bluethgen | 360/13 |
| 4,547,816 | 10/1985 | Sochor | 360/32 X |
| 4,555,737 | 11/1985 | Hatmann | 360/13 |

FOREIGN PATENT DOCUMENTS

| | | |
|---|---|---|
| 0017803 | 10/1980 | European Pat. Off. . |
| 2458192 | 12/1980 | France . |
| 2059135 | 4/1981 | United Kingdom ............... 360/19.1 |

OTHER PUBLICATIONS

Patents Abstracts of Japan, vol. 8, No. 153, Jul. 17, 1984, (p. 287), 3 pg., 1590.
Abstract of JP 59-52415.

*Primary Examiner*—Aristotelis M. Psitos
*Attorney, Agent, or Firm*—Michael J. Striker

[57] ABSTRACT

A process for storing picture synchronous sound signals is provided. The sound signals are divided into segments for this purpose, whose cycle is equal to the cycle of the associated video signal segments. In addition to the sound data of the actual video signal segment each sound signal segment also includes one portion of the sound data of the preceding video signal segment and the subsequent video signal segment. The sound signal segments are time compressed to the length of the video signal segments for recording or transmitting. The sound signals can be softly changed over due to overlapping during backplay and cutting.

6 Claims, 8 Drawing Figures

PROCESS FOR STORING DIGITALLY CODED VIDEO SYNCHRONOUS SOUND SIGNALS THROUGH TIME COMPRESSION BY DUPLICATING SOUND DATA DURING RECORDATION

STATE OF THE ART

The invention is based on a process for storing of digitally coded video synchronous sound signals in accordance with the type of the main claim. A process for interference signal free assembly of two digitally coded signal segments is already known from DE-OS 32 33 287, in particular of sound signals which are associated with television picture scenes. With the known process it is possible to changeover picture synchronous sound signals in discrete time cycles, preferably in the range of between two half or full pictures without any intermediary stage. However, for this purpose it is required that alternating scanned values or pairs of scanned values must be recorded alternately in at least two channels, and that the transmission for the scanned values of the first sound signal occurs at different time intervals in the different recording channels with respect to the scanned values of the second sound signal. Within the changeover interval which is defined by the actual transmission of the significance of the data of the signal segment to be gated out is changed from a nominall value to a minimal value and the significance of the data of the signal segments to be gated in are changed from a minimum value to a nominal value.

A playback device for pulse code modulated signals (PCM-signals) is also known from DE-OS 30 32 673 which is provided with an editing circuit which expands the PCM-signal trains beyond the intended cutting location with the assistance of delays. Thereby, the PCM-signal trains are alternately supplemented with correcting signals and the output signals of the first PCM-pulse train is brought from a large significance Xl to a small significance XO and the data of the second PCM-pulse train from a small significance XO to a large significance Xl with the assistance of multiplication circuits. Accordingly, the signals characterized by the first PCM-pulse train are gated out in the area of the cutting location and the signals which are characterized by the second pulse train are grated in at the same area of the cutting edge.

ADVANTAGES OF THE INVENTION

In contrast thereto, the process in accordance with the invention for storing digitally coded picture synchronous sound signals with the characterizing features of the main claim is advantageous in that the sound signals from the PCM- pulse train to be gated out as well as the PCM-pulse train of the sound signals to be gated in are available without a two channel recording in the area of any given cutting location between two half or full pictures. A further advantage is that the location of the sound recording is not displaced with respect to the location of the video recording, even during a repeated cutting editing, so that the required lip synchronisation is maintained.

Advantageous further embodiments and improvements of the process stated in the main claim are possible due to the measures stated in the subclaims. It is particularly advantageous that the cut can be simulated as often as desired without destroying the original recording of the cutting location taken into consideration. Therefore, it is no longer required to make protective copies before the cutting editing in case that a cut is made erroneously.

Drawing

Exemplified embodiments of the invention are illustrated in the drawing and are explained in more detail in the following description. The drawings show FIG. 1 a–d schematically the time cycle of the video information, the sound information before and during the recording, as well as during the playback in accordance with a first exemplified embodiment, FIG. 2 a–d also schematically the time cycles in accordance with a second exemplified embodiment of the invention.

Description of the Exemplified Embodiments

Line (a) of FIG. 1 schematically illustrates the cycle of the video data for a picture sequence: n, n+1,n+2,n+3. Thereby, the illustrated segments may represent either half pictures, full pictures or subsegments of the same. The data flow is interrupted in the transmission area V between the half or full pictures of the subsegments of the same which, for example, corresonds to the V-gap in the video signal.

Sound data segments are formed of the continuous sound data belonging to the video data, whose repeat frequency corresponds to the video data segments. However, in accordance with the invention the amount of the sound data belonging to a video data segment also includes sound data which belong to a preceding video segment and such sound data which belong to a subsequent video data segment. Consequently an overlapping of the sound data to be recorded occur and thereby a double recording in the overlapping segment. Subsequently, the sound data segments t, $t_{n+1}$, $t_{n+2}$, $t_{n+3}$ are time compressed, with generally known digital storage devices, in such a manner that the sound information including the information ranges from the preceding and the following video data segment belonging to one video data segment are recorded within the cycle which also corresponds to the video data segment. These time compressed sound data segments are indicated in line (b) FIG. 1 as $t'_n, t'_{n+1}, t'_{n+2}$, and $t'_{n+3}$.

In this form the sound data segments can be recorded onto a magnetic tape by means of one channel, that is, with one single circuit. In this form they are also cutable in a simple manner: During the transmission from one video scene to the following a sound data can be placed harshly on top of each other at the cutting location. During the gating out of the old sound information no Read-Modify-Write cycle must be passed, because a soft changeover is performed automatically during backplay. The sound data segments are again time expanded to the original time period during the backplay in accordance with line c of FIG. 1, so that the overlap in range T. The dotted line represents sound data segments in accordance with line (c) of FIG. 1 for ones of index n, n+2,n+4, etc., while the full line represent the segments of index n+1,n+3,n+5 etc. The sound data recorded in the overlapping range T are also contained in successive segments. Sound signal segments are changed during the backplay by using digital multiplication circuits in conjunction with a ramp generator in the overlapping range T in such a manner that the multiplication factor changes on the output of each multiplication circuit for the duration of time T from a maximum to a minimum or vice versa. Therefore, the multiplication factor for the signal of the outgoing sound segment changes in the time T between the value 1.0 to 0.0 and the multiplication factor for the incoming sound signal in the time T between the values 0.0 and 1.0. For an available sound information corresponding to line (c) of FIG. 1, a changeover process between identical data occurs constantly during time T during the continuous operation in accordance with (d). Due to this changeover between identical sound information the changeover is not recognizeable in the signal: The undisturbed sound signal is transmitted.

When adding an actual television scene to an already earlier recorded television scene by means of a harsh cut the time compressed recorded sound data are also harshly cut. Due to the corresponding base delays in the video signal and the continuous changeover of the sound segments during playback it is accomplished that the sound data of the outgoing television scene are maintained beyond the cut time point for the duration of the half changeover interval T. Analogous thereto, the sound data of the new video scene are contained, for the time of the half changeover duration T before the start of the video data recording, in the recorded sound signal. The changeover is performed interference free during the transmission from the one sound performance to the following by means of a changeover process according to FIG. 1 (d), in particular without any undesirable sudden sound amplification changes.

Figure 2:
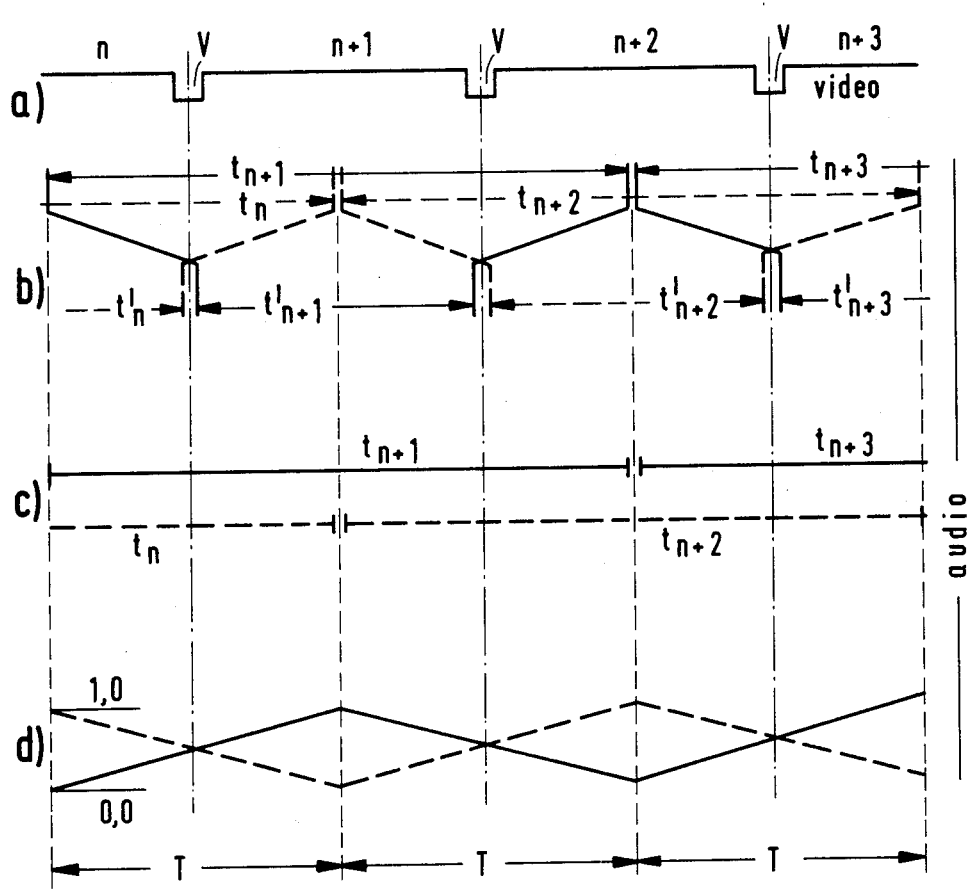

The recording and backplay of a sound performance belonging to a defined video signal, which is divided into segments, is performed in the exemplified embodiment of FIG. 2 principally in the same manner as in exemplified embodiment of FIG. 1, however, the changeover intervals T are so selected that they run in a timely sequence without any interruption. Therefore, the sound data segments include not only the sound data belonging to the actual video data segment, but also the half of the sound data of the preceding video data segment and also half of the sound data of the subsequent video data segment. Therefore, in accordance with FIG. 2(c) the sound data are doubly recorded. Thus, a great safety against data loss is obtained because of the 100% redundancy, without using complex error protective measures. During the backplay of such recorded sound data a continuous changeover process is performed for the duration of the changeover intervals T in the same manner as for FIG. 1(d), described in FIG. 2 (d). However, since these changeover intervals T are succesively arranged without any joints a continuous changeover occurs. This technology results in the continuous video scene in an interference free sound signal, during the changeover from one sound performance to the next in a sufficiently large changeover interval, so that interfering sound amplification changes are eliminated and finally it permits the reconstruction of the scanning values from the preceding and subsequent sound data segment in case of a data loss of a sound data segment.

What is claimed is:

1. A process for storing a plurality of digitally coded sound signals that are synchronous with video signals, the process comprising steps of:
providing a plurality of successive sound data signal segments associated with a successive plurality of video data signal segments, each of the sound data signal segments being digitally coded with sound data synchronously associated with a time cycle of a respective one of the video data signal segments, the video data signal segments constituting a plurality of immediately preceding and succeeding video data segments relative to each other, the sound data associated with the video data segments constituting a first and second half of the sound data;
time compressing the sound data; and
editing into a time period corresponding to the time cycle of the respective one of the video data signal segments, a reproduction of a second half of the time compressed sound data associated with the immediately preceding video data signal segment and a reproduction of a first half of the time compressed sound data associated with the immediately succeeding video data signal segment in addition to the time compressed sound data synchronously associated with the respective one video data signal segment so as to store a 100% redundancy of the sound data during the time period.

2. The process in accordance with claim 1, wherein the edited time period corresponds to the time cycle of one video data signal segment representing a half video frame.

3. The process in accordance with claim 1, wherein the edited time period corresponds to the time cycle of one video data signal segment representing a full video frame.

4. The process in accordance with claim 1, wherein the editing includes editing the time compressed sound data signal segments at a predetermined editing location during a transmission from one video data signal segment to an immediately succeeding video data signal segment by placing sound data on top of each other at the predetermined editing location to thereby overlap identical data segments.

5. A process for storing and reproducing a plurality of digitally coded sound signals that are synchronous with video signals, the process comprising steps of:
providing a plurality of successive sound data signal segments associated with a successive plurality of video data signal segments, each of the sound data signal segments being digitally coded with sound data synchronously associated with a time cycle of a respective one of the video data signal segments, the video data signal segments constituting a plurality of immediately preceding and succeeding video data segments relative to each other, the sound data associated with the video data segments constituting a first and second half of the sound data;
time compressing the sound data;
editing into a time period corresponding to the time cycle of the respective one of the video data signal segments, a reproduction of a second half of the time compressed sound data associated with the immediately preceding video data signal segment and a reproduction of a first half of the time compressed sound data associated with the immediately succeeding video data signal segment in addition to the time compressed sound data synchronously associated with the respective one video data signal segment so as to store a 100% redundancy of the sound data during the time period, the storing producing overlaps of the successive sound signals;
backplaying the time compressed sound signal segments; and changing the time compressed sound signal segments during the backplaying so that a signal of an outgoing time compressed sound signal segment changes from a maximum to a minimum value and an incoming time compressed sound signal segment changes from a minimum to a maximum value so as to effect a changeover interval between idential sound data which were time compressed for adjacent time cycles.

6. A process for storing and reproducing a plurality of digitally coded sound signals that are synchronous with video signals, the process comprising steps of:

providing a plurality of successive sound data signal segments associated with a successive plurality of video data signal segments, each of the sound data signal segments being digitally coded with sound data synchronously associated with a time cycle of a respective one of the video data signal segments, the video data signal segments constituting a plurality of immediately preceding and succeeding video data segments relative to each other, the sound data associated with the video data segments constituting a first and second half of the sound data;

time compressing the sound data;

editing into a time period corresponding to the time cycle of the respective one of the video data signal segments, a reproduction of a second half of the time compressed sound data associated with the immediately preceding video data signal segment and a reproduction of a first half of the time compressed sound data associated with the immediately succeeding video data signal segment in addition to the time compressed sound data synchronously associated with the respective one video data signal segment so as to store a 100% redundancy of the sound data during the time period;

backplaying the time compressed sound signal data segments; and time expanding the sound data signal segments during the backplaying.

* * * * *